E. M. COFFIN.
CONDUIT FASTENER.
APPLICATION FILED DEC. 27, 1916.
1,288,515.
Patented Dec. 24, 1918.
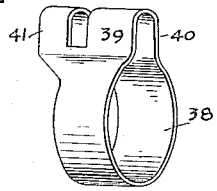
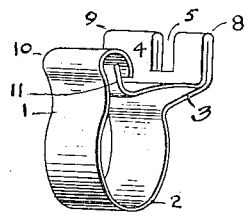
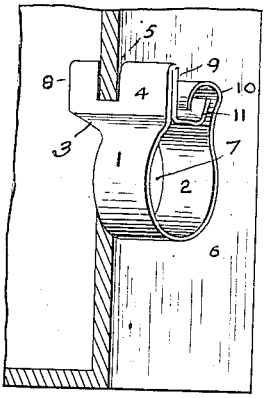
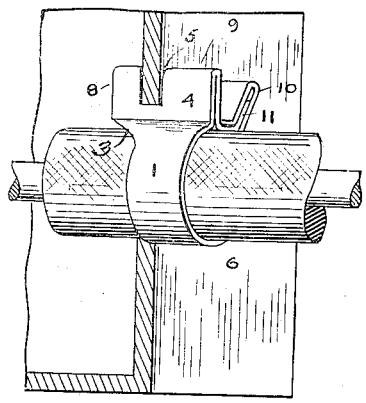
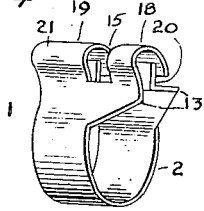
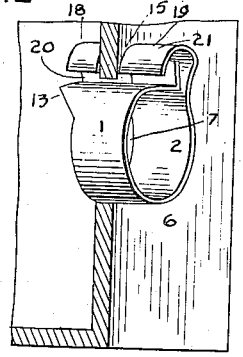
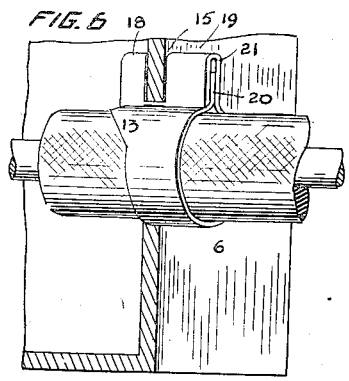
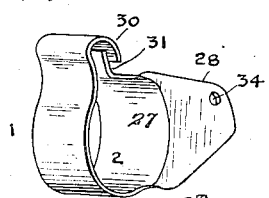
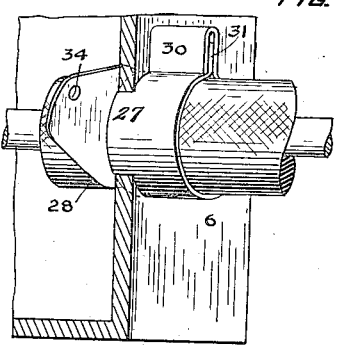
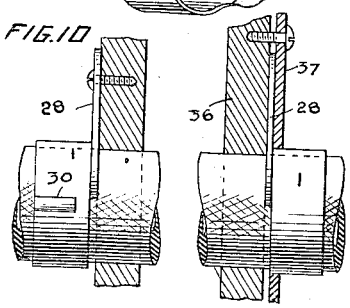
INVENTOR,
EVERETT M. COFFIN,
BY
ATT'Y

UNITED STATES PATENT OFFICE.

EVERETT M. COFFIN, OF PIEDMONT, CALIFORNIA.

CONDUIT-FASTENER.

1,288,515.  Specification of Letters Patent.  Patented Dec. 24, 1918.

Application filed December 27, 1916. Serial No. 139,132.

*To all whom it may concern:*

Be it known that I, EVERETT M. COFFIN, a citizen of the United States, residing at Piedmont, in the county of Alameda and State of California, have invented new and useful Improvements in Conduit-Fasteners, of which the following is a specification.

This invention relates to improvements in conduit fasteners, such as are employed for securing in position a conduit used to protect a wire entering a switch box, outlet box or plate.

Always heretofore, so far as my knowledge extends, in securing such a conduit to a switch box by a fastener, besides placing the fastener in position adjacent to the hole in the switch box, and with a part thereof extending through said hole, passing the conduit through the fastener, and clamping the fastener around the conduit, other operations have been necessary, such as additionally securing the fastener to the switch box, or changing the relative position of some part of the fastener, as by bending the same, or by moving one part of the fastener relatively to another.

The object of the present invention is to provide a single-piece fastener so constructed that no additional operations are necessary besides the three first mentioned. By my invention, for the first time, there is provided a single-piece fastener of the utmost possible simplicity of construction and operation, since it is evident that said first three operations are all that are absolutely necessary.

In the accompanying drawing, Figure 1 is a perspective view, looking obliquely from the rear, of one form of my improved conduit fastener; Fig. 2 is a front perspective view, a wall of a switch box being shown partly in section; Fig. 3 is a view similar to Fig. 2, showing also a conduit clamped in said fastener; Figs. 4, 5 and 6 are views, similar to Figs. 1, 2 and 3, of another form of the invention; Figs. 7, 8 and 9 are views, similar to Figs. 1, 2 and 3, of a third form thereof; Figs. 10 and 11 are sectional views showing other modes of use of said third form; Fig. 12 is a perspective view of a fourth form of the invention.

Referring to the drawing, 1 indicates my improved fastener, formed of a single piece of somewhat stiff non-resilient sheet metal, cut out from a blank to form a band, tube or ring 2. One end of this tube is square thereto, but the other end has a longitudinal extension 3 formed by widening a portion of the band, and the band and extension are folded or doubled along a line transverse to the general direction of the band to form a lateral outward extension 4 of said extension, the material on opposite sides of the fold being pressed firmly together to form a shoulder 4 extending outwardly from said band. A recess 5 is formed in the outer edge of this shoulder sufficiently wide to receive the edge of a wall 6 of a switch box around a hole 7 in said wall 6, through which hole 7 the conduit can enter the switch box, the parts of the shoulder 4 on opposite sides of said recess 5, forming two stops 8 and 9 arranged to abut against opposite sides of said wall 6.

The terminal portions of the band extend outward, first approximately parallel with each other, one, 10, of them being longer than the other, 11, and being bent over or around the end of the other, but spaced therefrom, so that the band is large enough to permit the conduit to be passed therethrough. The stop 8 of the conduit fastener is passed through the hole 7 in the wall of the switch box and said conduit fastener is placed in position with the two stops 8 and 9 abutting against opposite sides of the wall of the switch box. When the conduit has been passed through the band, said terminal portions are pressed tightly together by a suitable instrument, thereby contracting the band around the conduit. The conduit is there firmly secured to the switch box.

In the form of the invention shown in Figs. 4, 5 and 6, said other end of the band is extended, as shown at 13, by widening its terminal portions 20, 21, and said terminal portions extend in like manner as in the first form, but in this case a recess 15 sufficiently wide to receive the edge of the wall of the switch box is made in said terminal portions, thus forming two stops 18 and 19, which are adapted to abut against opposite sides of the wall of the switch box. When the conduit has been passed through the band, both of said terminal portions 20, 21 are then pressed tightly together, thereby contracting the band around the conduit and firmly clamping the conduit therein.

In the form of the invention shown in Figs. 7, 8 and 9, the tube or band besides being extended longitudinally on one side, as shown at 27, is formed with an extension 28 from the end of the extension 27, said extension 28 being in a plane transverse to the axis of said tube, instead of being parallel thereto, as in the first and second forms of the invention. In this form of the invention, also, one terminal portion 30 is longer than the other terminal portion 31, and is bent around the end of the same, but spaced therefrom, so that when said terminal portions are compressed tightly together, the band is contracted around the conduit. In this form of the invention, the extension 28 on one side of the wall, and the extension comprising the terminal portions 30, 31, on its other side, prevent the conduit from moving longitudinally in relation to the switch box. The extension 28 is formed with a small hole 34 sufficiently large to enable a small nail or screw to be passed therethrough by which the fastener can be secured at the outlet to prevent endwise motion, as shown in Fig. 10, or can be secured to the back of a piece of wood to which the outlet box is fastened, thereby preventing endwise motion and securing the conduit in the outlet box. In Fig. 11 the extension is shown as secured between a wooden piece 36 and a metal plate 37 secured thereto.

In the form of the invention shown in Fig. 12, the device is in the form of a tube 38 having one side contracted or collapsed, but not wholly so, thus forming an extension 39, the remainder of the tube being approximately cylindrical. Said extension is recessed from its outer edge to form two stops 40, 41, engaging opposite sides of a wall of a switch box. When said extension 39 is completely collapsed, the tube 38 is clamped around the conduit.

I do not show herein any small prongs pressed inwardly from the material forming the band, as these are common in the art and may or may not be used as desired.

It will be seen that the principle embodied in these different forms of the invention is the same, namely, that the ring or tube should have a part or extension 9 or 19 or 30 and 31, or 41, adapted to contact with one side of a wall of a switch box adjacent to a hole therein and should also have a part 8, 18, 28 or 40 extending through said hole and adapted to engage the other side of said wall when the conduit is in the tube, and that said part 8, 18, 28 or 40 should be capable of passing through said hole, when the conduit is out of the tube, by first moving the tube in a direction parallel with the wall, so that said extension is opposite to said hole, and then transversely thereto, but is incapable of passing through said hole when the conduit is in the tube, and that the fastener should also comprise means, as the terminal portions of the tube, for clamping the conduit in the tube.

I claim:—

1. A fastener for securing an electric conduit entering a switch or outlet box comprising a ring, one end of which has at one side only a longitudinal extension length not less than the thickness of the box, said extension having at its free end a lateral outward extension, the opposite side of the same end of the ring being free from obstructions preventing movement of the ring in the direction transverse thereto and opposite to that of the last-named extension.

2. A fastener for securing an electric conduit entering a switch or outlet box comprising a one-piece ring, an end of which has at one side only a longitudinal extension length not less than the thickness of the box, said extension having at its free end a lateral outward extension, the opposite side of the same end of the ring being free from obstructions preventing movement of the ring in the direction transverse thereto and opposite to that of the last-named extension.

E. M. COFFIN.